Patented July 10, 1951

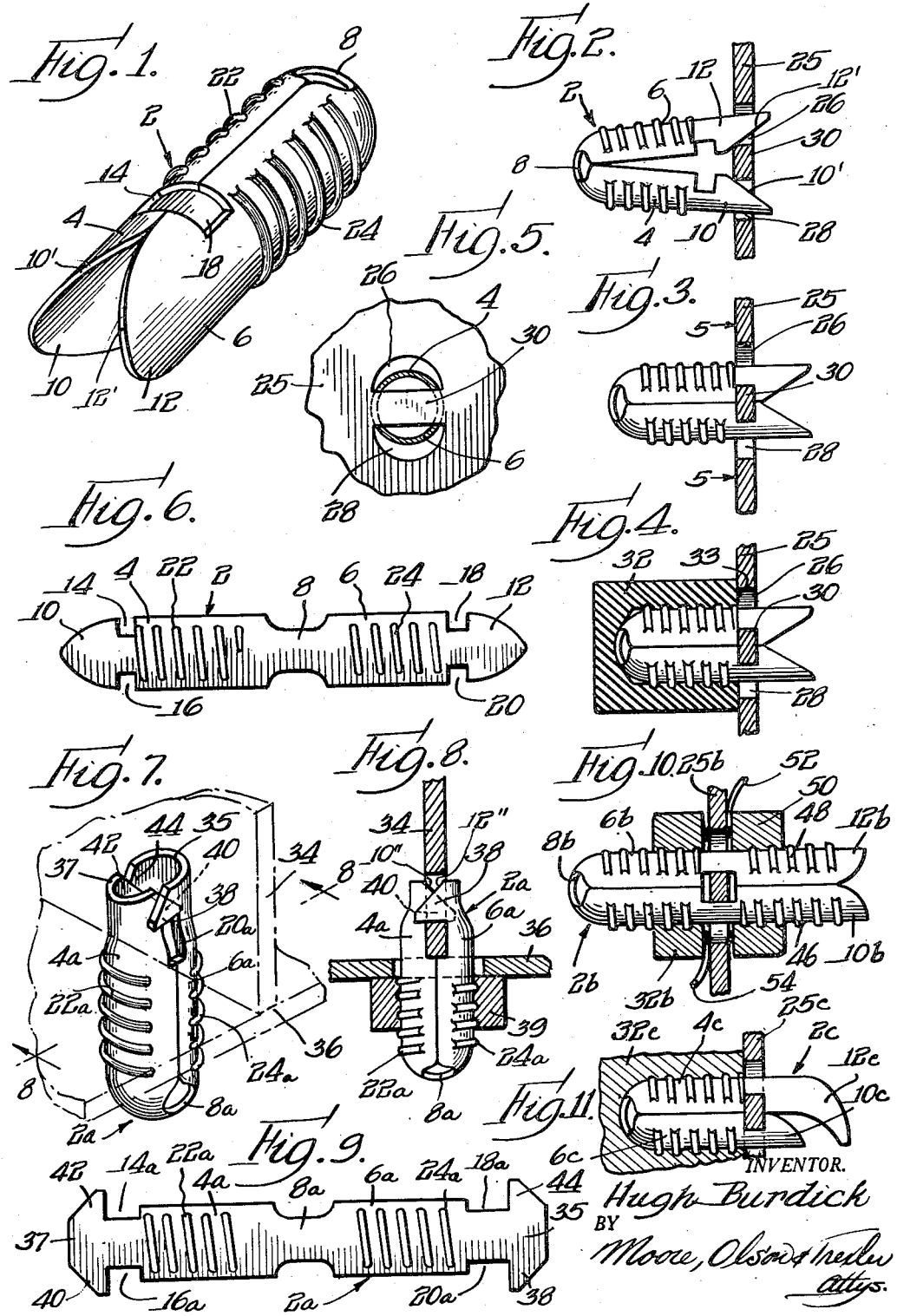

2,560,211

UNITED STATES PATENT OFFICE 2,560,211

SHELF MOUNTING STRUCTURE

Hugh T. Burdick, Chicago, Ill., assignor to Illinois Tool Works, Chicago, Ill., a corporation of Illinois Application December 31, 1947, Serial No. 794,911

4 Claims. (Cl. 151—41.7)

This invention relates generally to fasteners and more particularly to fasteners of the type equipped to clampingly interlock with and project outwardly from a work piece in readiness to telescopically accommodate a fastening member such as a nut.

To mount a fastener having a shank-like portion which is to extend outwardly from the accessible surface of a blind installation has long presented a challenging problem. The problem is even more complex in instances where the shank-like portion of the fastener is to accommodate a complementary member such as a nut. Heretofore manufacturers have, in many instances, used fasteners which must be assembled with a panel from the inaccessible side thereof prior to its fabrication into a unit, or have used fasteners which are secured to the accessible surface by welding or the like. To mount these types of fasteners on a panel requires considerable time and effort and their removal or replacement is particularly difficult. A fastener for such blind installations should be readily attachable to and demountable from the accessible side of the panel, and yet should be secure against unauthorized removal from the panel. In addition, if the shank-like portion of the stud is to accommodate a nut member or the like, the fastener should preferably be non-rotatably mounted in the panel. Therefore, it is an important object of this invention to provide a fastener for blind installations which may be mounted in an apertured work part by bringing it into registration with the work aperture and then applying axial pressure so as to cause automatic final assembly.

It is still another important object of the present invention to provide a fastener of the type described above which is simple in design and, although made of sheet material, has great shear and tensile strength, and may be economically produced by practicing well-known manufacturing methods.

It is still a further object of the present invention to provide a fastener of the type heretofore referred to having a shank-like portion provided with peripheral extrusions or protuberances for accommodating the internal threads of a complementary member such as a nut.

It is still a further object of the invention to provide a fastener of the type referred to which, after final assembly, is secured against axial and rotative movement relative to the panel on which it is mounted, and yet which is removable without damage to the work piece.

It is still a further object of the present invention to provide a fastener of the type referred to above which is particularly well-adapted for securing panels or work sheets in angular relation to each other.

The foregoing and other objects and advantages will be more apparent from the following detailed description when considered in connection with the accompanying drawing wherein:

Figure 1 is a persepctive view of a fastener of the type contemplated by the present invention;

Figure 2 is a side view of the fastener during initial application thereof to apertures in a work piece, the work piece being shown in section;

Figure 3 is a side view of the fastener shown in Figure 2 after complete insertion thereof within a work piece;

Figure 4 is a similar view of the fastener finally secured by an internally threaded member or nut;

Figure 5 is a transverse sectional view of the fastener taken along the line 5—5 in Figure 3;

Figure 6 is a plan view of the blank from which the fastener shown in Figures 1 to 5, inclusive, may be formed;

Figure 7 is a perspective view of two angularly disposed work sheets (shown by dot-and-dash lines) secured to each other by means of a modified form of the fastener contemplated by the present invention;

Figure 8 is a vertical sectional view taken along the line 8—8 in Figure 7;

Figure 9 is a plan view of the blank from which the fastener shown in Figures 7 and 8 may be formed;

Figure 10 is a side view of a modified form of the fastener mounted within a work piece; and Figure 11 is a side view of a further modified form of the fastener contemplated by the present invention.

Referring now to the drawing wherein like numerals have been employed to designate similar parts throughout the various views, it will be seen that one embodiment of the invention resides in a sheet metal clip or fastener designated generally by the numeral 2, Figures 1 to 6, inclusive. The fastener 2, which is of one-piece construction, consists of two oppositely concaved arms or shank portions 4 and 6 joined at one extremity by the connecting portion 8. The longitudinal edges of the arm members 4 and 6 lie in abutting relation. Free end portions or tips 10 and 12 of the arm members 4 and 6, respectively, are shaped to provide angularly disposed or cam edges 10' and 12', respectively. Intermediate the free end portions 10'—12' and the connecting portion 8, the longitudinal edges of the arms 4 and 6 are provided with notches or recesses 14 and 16 and 18 and 20, respectively. These notches 14—16—18—20 constitute work engaging means and accommodate a work piece or sheet 25 when the fastener 2 is completely inserted within work apertures 26 and 28. A series of peripheral extrusions or convolutions 22 and 24 are provided on the arms 4 and 6, respectively, between connecting portion 8 and notches 14—16—18—20. These peripheral extrusions or threads 22 and 24 are provided to receive an internally threaded member 32.

Figures 2, 3 and 4 disclose the manner in which the fastener is applied to the work piece 25. For purposes of disclosure the apertures 26—28 are shown as D-shaped or semi-circular apertures having a web or strip of material 30 separating them. In mounting the fastener 2 on the work piece 25 the free end portions 10 and 12 of the arms 4 and 6, respectively, are first brought into registration with the apertures 26—28 and then force, in an axial direction, is applied to the fastener. As seen in Figure 2, the diverging edges 10'—12' provided on the free extremities 10 and 12 of the arms 4 and 6 present cam surfaces which coact with the work material to spread the two shank portions 4 and 6 as the axially directed force is applied. Continued inward shifting ultimately brings the notches 14—16—18—20 into registration with the web 30. Figure 3 discloses the web 30 interlocked with the notches 14—16—18—20 of the shank portions 4 and 6. In this position the fastener is non-rotatably preassembled with or mounted upon the work piece 25.

Figure 4 shows an internally threaded member or nut 32 applied to the complementary extrusions 22 and 24 of the fastener, which nut has been tightened against the outer or accessible surface of the work piece 25. The member 32 positively prevents separation of the arms 4 and 6 thereby assuring fixed, non-rotatable attachment of the fastener to the work piece. Tightening the member or nut 32 against the work piece 25 causes the shoulders defined by the notches 14—16—18—20 to clampingly engage the work piece 25, thereby positively securing the fastener 2 within the work piece. The threaded member 32 is preferably of sufficient external diameter to cover the apertures 26—28 thus affording a sealed installation. This is especially significant when the fastener is used in conjunction with a refrigerator box or the like. The threaded member 32 may be made of any type of material such as metal, plastic or the like. Resilient material such as rubber or plastic is preferable where the mounting is made on a panel having a prepared surface such as enamel or paint to prevent cracking or chipping of the surface.

Figures 7 and 8 disclose another embodiment of the fastener which is particularly well adapted for securing panels in angular relation to each other. The fastener 2a is similar to fastener 2 shown in Figures 1 to 6, inclusive, the difference residing in the design of the free extremities or end portions 35 and 37. In this embodiment the arms 4a and 6a are provided with overlapping tabs 38, 40, 42, and 44. Tabs 40 and 42 are embraced or overlapped by tabs 38 and 44 for insuring maintenance of the shank portions 4a and 6a in tubular alignment. The free extremities 35 and 37 have cam surfaces 12" and 10" along their longitudinal edges which are similar to those in the embodiment shown in Figure 1. A nut 39 is mounted on the shank of the fastener to hold the fastener in engaged position relative to the work piece. Figure 9 shows the blank from which the fastener 2a has been formed.

Figure 10 discloses still a further modified form of the fastener and is designated generally by the numeral 2b. The free end portions 10b and 12b of the arms 4b and 6b extend a sufficient distance beyond the surface of the work piece to permit association of two nut members 32b and 50. This form of fastener is particularly well adapted to be used as a terminal post where a plurality of wires 52 and 54 are to be secured on opposite sides of a panel.

Figure 11 shows another form of the invention. Fastener 2c has arms 4c and 6c whose free end extremities are formed in such a manner that no sharp edges are exposed. The fastener 2c operates in a fashion similar to the manner in which the embodiments heretofore described function.

From the foregoing it will be apparent that the present invention contemplates a fastener or clip made from sheet material which may be produced economically by the practice of conventional stamping and forming methods. The fastener is designed to be attached to and removed from one surface of a panel and therefore is particularly well adapted for use in blind installations. The shank portions provided with cam surfaces are designed to facilitate association of the work engaging means with the apertured panel, the work engaging means along the margins of the shank portions retaining the fastener against axial and rotative movement relative to the panel.

It is obvious that the invention heretofore described in detail may be embodied in other forms without departing from the spirit of the invention. The scope of the invention is not to be limited except as indicated by the appended claims.

The invention is hereby claimed as follows:

1. A blind fastener for mounting within an aperture of a work piece comprising a one-piece sheet metal stamping which includes a pair of oppositely concaved elongated shank portions, a section connecting said shank portions at one end thereof, at least a portion of the longitudinal complementary edges of the shank portions adapted for abutting relation when said portions are shifted transversely toward each other, said shank portions at a point spaced axially from said connecting section having marginal cut-out notches formed in the longitudinal edges thereof for receiving a work piece, said notches presenting transversely extending shoulders for positively abutting a work piece upon initial insertion of the fastener within an apertured work piece to assure a required extent of projection of said shank portions from one surface of a work piece, transversely extending shoulders for abutting the opposite side of the work piece to counteract withdrawal of the fastener, and helically disposed peripheral extrusions located intermediate the connecting section and said notches for accommodating a complementary internally threaded part.

2. A blind fastener as set forth in claim 1, wherein the extremity of the fastener oppositely disposed from the connecting section is provided with cam surfaces to facilitate spreading of the free extremities of the shank portions upon initial insertion thereof within an apertured work piece.

3. A blind fastener as set forth in claim 1, wherein the work accommodating notches consist of pairs of registering notches provided within adjacent margins of the shank portions spaced axially from the connecting section.

4. A blind fastener as set forth in claim 1, wherein free extremities of the shank portions oppositely disposed from the connecting section are provided with circumferentially and adjacently overlapping margins to lend shank strength in that vicinity.

HUGH T. BURDICK.

REFERENCES CITED

The following references are of record in the file of this patent:

UNITED STATES PATENTS

| Number | Name | Date |
|---|---|---|
| 384,273 | Anderson | June 12, 1888 |
| 1,194,509 | Kosovsky | Aug. 15, 1916 |
| 1,315,998 | Southgate | Sept. 16, 1919 |
| 1,426,237 | Witzberger | Aug. 15, 1922 |
| 1,860,186 | Kestenman | May 24, 1932 |
| 2,069,849 | Rich | Feb. 9, 1937 |
| 2,084,554 | Dowse | June 22, 1937 |
| 2,150,080 | Rawlings | Mar. 7, 1939 |

FOREIGN PATENTS

| Number | Country | Date |
|---|---|---|
| 52,124 | Germany | May 14, 1890 |